(12) United States Patent
Kim

(10) Patent No.: US 9,399,583 B2
(45) Date of Patent: Jul. 26, 2016

(54) SILICON CARBIDE POWDER PRODUCTION METHOD

(71) Applicant: LG INNOTEK CO., LTD., Seoul (KR)

(72) Inventor: Byung Sook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 116 days.

(21) Appl. No.: 14/368,452

(22) PCT Filed: Dec. 28, 2012

(86) PCT No.: PCT/KR2012/011712
§ 371 (c)(1),
(2) Date: Jun. 24, 2014

(87) PCT Pub. No.: WO2013/100693
PCT Pub. Date: Jul. 4, 2013

(65) Prior Publication Data
US 2014/0356626 A1    Dec. 4, 2014

(30) Foreign Application Priority Data
Dec. 28, 2011  (KR) .......................... 10-2011-0144930

(51) Int. Cl.
*C01B 31/36*    (2006.01)

(52) U.S. Cl.
CPC .............. *C01B 31/36* (2013.01); *C01P 2004/62* (2013.01); *Y10T 428/2982* (2015.01)

(58) Field of Classification Search
None
See application file for complete search history.

(56) References Cited

U.S. PATENT DOCUMENTS

| 4,529,575 A  | * | 7/1985 | Enomoto | ................... | B01J 8/12 |
| | | | | | 423/345 |
| 2012/0201735 A1 | * | 8/2012 | Kim | ...................... | B82Y 30/00 |
| | | | | | 423/345 |
| 2013/0129599 A1 | * | 5/2013 | Kim | ...................... | B82Y 30/00 |
| | | | | | 423/345 |
| 2013/0272947 A1 | * | 10/2013 | Qadri | ..................... | C01B 31/36 |
| | | | | | 423/345 |
| 2014/0209838 A1 | * | 7/2014 | Han | ........................ | C01B 31/36 |
| | | | | | 252/500 |
| 2014/0301933 A1 | * | 10/2014 | Masuda | ................. | C01B 31/36 |
| | | | | | 423/346 |

FOREIGN PATENT DOCUMENTS

| JP | 3174622 B2 | 6/2001 |
| KP | 10-2011-0021530 A | 3/2011 |
| KR | 10-1996-0014907 B1 | 10/1996 |
| KR | 10-2010-0071863 A | 6/2010 |
| KR | 10-2011-0022424 A | 3/2011 |
| KR | 10-2011-0073872 A | 6/2011 |
| KR | 10-1084711 B1 | 11/2011 |

OTHER PUBLICATIONS

Translation KIPO Pub. No. 1020100115993; Dec. 14, 2015.*

(Continued)

Primary Examiner — Guinever S Gregorio
(74) Attorney, Agent, or Firm — Saliwanchik, Lloyd & Eisenschenk

(57) ABSTRACT

A method for preparing silicon carbide powder according to an embodiment of the present disclosure includes the steps of: mixing a silicon (Si) source with a carbon (C) source including a solid carbon source or an organic carbon compound, and a silicon dioxide (SiO2) source, to form a mixture; and allowing the mixture to react, wherein the molar ratio of silicon dioxide in the silicon dioxide source to the sum of silicon in the silicon source and carbon in the carbon source is 0.01:1 to 0.3:1.

8 Claims, 1 Drawing Sheet

(56) References Cited

OTHER PUBLICATIONS

International Search Report in International Application No. PCT/KR2012/011712, filed Dec. 28, 2012.

Office Action dated Nov. 28, 2013 in Korean Application No. 10-2011-0144930, filed Dec. 28, 2011.

* cited by examiner

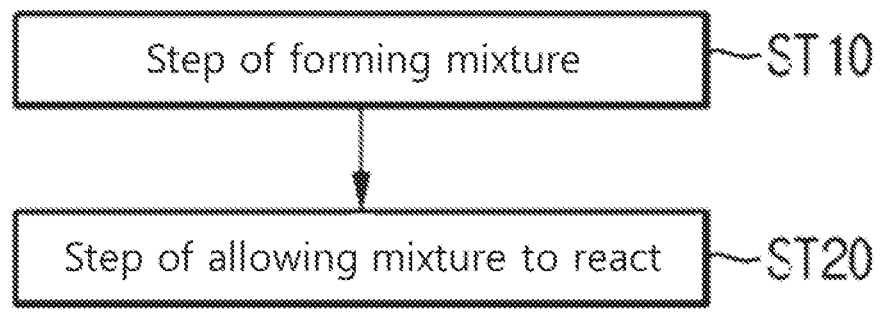

SILICON CARBIDE POWDER PRODUCTION METHOD

CROSS-REFERENCE TO RELATED APPLICATIONS

This application is the U.S. national stage application of International Patent Application No. PCT/KR2012/011712, filed Dec. 28, 2012, which claims priority to Korean Application No. 10-2011-0144930, filed Dec. 28, 2011, the disclosures of each of which are incorporated herein by reference in their entirety.

BACKGROUND OF THE INVENTION

1. Field of the Invention

Exemplary embodiments of the present disclosure relate to a method for preparing silicon carbide powder.

2. Description of the Prior Art

Silicon carbide has found use as semiconductor material for various electronic devices and purposes in recent years. Silicon carbide is especially useful due to its physical strength and high resistance to chemical attack.

Silicon carbide also has excellent electronic properties, including radiation hardness, a relatively wide band gap, high saturated electron drift velocity, high-temperature operation, and absorption and emission of high-energy photons in the blue, violet, and ultraviolet regions of the spectrum.

Silicon carbide powder can be prepared, for example, by mixing raw materials such as a silicon (Si) source and a carbon (C) source and heating the mixture. Known methods for preparing silicon carbide powder include the Acheson process, the carbothermal reduction process, the liquid polymer thermal decomposition process, the direct reaction process or the CVD process. Particularly, the liquid polymer thermal decomposition process or the carbothermal reduction process has been used to prepare high-purity silicon carbide powder.

Among the above-mentioned processes, the direct reaction process is a process of synthesizing silicon carbide powder by a direct reaction between carbon (C) and silicon (Si) and has an advantage over other processes in that it can prepare high-purity silicon carbide powder.

However, the direct reaction process has a problem in that it is difficult to control the stoichiometric ratio between carbon and silicon. In other words, because silicon carbide powder is synthesized by a direct reaction between carbon and silicon, the direct reaction process has various problems, including residual carbon or silicon and a decrease in the purity of silicon carbide powder.

Accordingly, there is a need for a method capable of synthesizing high-purity silicon carbide powder using the direct reaction process.

SUMMARY OF THE INVENTION

Embodiments of the present disclosure provide a method capable of preparing high-quality silicon carbide powder using the direct reaction process.

In accordance with an embodiment of the present disclosure, a method for preparing silicon carbide powder includes the steps of: mixing a silicon (Si) source with a carbon (C) source including a solid carbon source or an organic carbon compound, and a silicon dioxide ($SiO_2$) source, to form a mixture; and allowing the mixture to react, wherein the molar ratio of silicon dioxide in the silicon dioxide source to the sum of silicon in the silicon source and carbon in the carbon source is 0.01:1 to 0.3:1.

BRIEF DESCRIPTION OF THE DRAWINGS

FIG. 1 is a process flow chart showing a method for preparing silicon carbide powder in accordance with an embodiment of the present disclosure.

DETAILED DESCRIPTION OF THE INVENTION

Hereinafter, a method for preparing silicon carbide powder in accordance with an embodiment of the present disclosure will be described with reference to the accompanying drawing.

FIG. 1 is a process flow chart showing a method for preparing silicon carbide powder in accordance with an embodiment of the present disclosure.

Referring to FIG. 1, the method for preparing silicon carbide powder in accordance with an embodiment of the present disclosure comprises the steps of (ST10) forming a mixture; and (ST20) of allowing the mixture to react.

Each step of the method will now be described in further detail.

In step (ST10) of forming a mixture, a silicon (Si) source, a carbon (C) source and a silicon dioxide ($SiO_2$) source are prepared and mixed with each other to form a mixture;

The silicon source may include high-purity metal Si.

The carbon source may include a solid carbon source or an organic carbon compound.

Examples of the solid carbon source include carbon black, carbon nanotubes (CNTs), fullerene $C_{60}$ and the like.

Examples of the organic carbon compound include phenol resin, franc resin, xylene resin, polyimide, polyurethane, polyacrylonitrile, polyvinyl alcohol, cellulose, sugar, pitch, tar and the like.

The silicon dioxide source may include various materials that can provide silicon. Examples of the silicon source include silica sol, silicon dioxide, fine silica, and quartz powder. However, embodiments of the present disclosure are not limited thereto, and an organic silicon compound containing silicon may be used as a silicon source.

This silicon source, carbon source and silicon dioxide source may be mixed with each other either by a wet mixing process using a solvent or by a dry mixing process that uses no solvent. When the wet mixing process is used, the silicon source, the carbon source and the silicon dioxide source can be condensed to increase productivity. On the other hand, when the dry mixing process is used, the cost and contamination problems resulting from the use of a solvent can be prevented and a carbonization process and the like can be omitted to simplify the process for preparing silicon carbide.

The silicon source, the carbon source and the silicon dioxide source are mixed with each other by a method such as ball milling or attrition milling, and the mixed powder is recovered. The mixed powder can be recovered by sieving.

The silicon source, the carbon source and the silicon dioxide source may be mixed with each other at a specific molar ratio. For example, the molar ratio of silicon in the silicon source to carbon in the carbon source (hereinafter referred to as ("the molar ratio of silicon to carbon") may be 1:0.8 to 1:1.2.

If the molar ratio of silicon to carbon is higher than 1:1.2, the amount of carbon will be excessive, and thus the amount of residual carbon that does not participate in the reaction will increase, resulting in a decrease in the recovery rate. If the molar ratio of silicon to carbon is lower than 1:0.8, the amount of silicon will be excessive, and thus the amount of residual silicon that does not participate in the reaction will increase, resulting in a decrease in the recovery rate. In other words, the molar ratio of carbon to silicon is determined in view of the recovery rate.

In view of the fact that the silicon source is volatilized to a gaseous state at a high temperature in the reaction step, the molar ratio of silicon to carbon may be 1:0.9 to 1.1.

In addition, the molar ratio of silicon dioxide in the silicon dioxide source to the sum of silicon in the silicon source and carbon in the carbon source (hereinafter referred to as "the molar ratio of silicon dioxide to the sum of silicon and carbon") may be 0.01-0.3 (silicon dioxide):1 (the sum of silicon and carbon). Preferably, the molar ratio of molar ratio of silicon dioxide to the sum of silicon and carbon may be 0.1-0.2:1.

If the molar ratio of silicon dioxide to the sum of silicon and carbon is higher than 0.3:1, there will be a problem in that residual silicon dioxide ($SiO_2$) and synthesized silicon carbide (SiC) react with each other to produce silicon monoxide (SiO) and carbon oxide gas (CO gas), resulting in a decrease in the yield. If the molar ratio of silicon dioxide to the sum of silicon and carbon is lower than 0.01:1, there will be a problem in that residual carbon (C) occurs, resulting in deterioration in the quality of the product.

The silicon source, the carbon source and the silicon dioxide source are uniformly mixed with each other to form a mixture.

Next, in step (ST20) of allowing the mixture to react, the mixture is allowed to react by heating. More specifically, the mixture is weighed in a graphite crucible, and then introduced and heated in a high-temperature reactor, for example, a graphite furnace. The process of forming the silicon carbide powder can be divided into a carbonization process and synthesis process.

In the carbonization process, the organic carbon compound can be carbonized to produce carbon. The carbonization process is performed at a temperature between about 600° C. and about 1200° C. More specifically, the carbonization process is performed at a temperature between about 700° C. and about 1000° C. If a solid carbon source is used as the carbon source, the carbonization process may not be performed.

Next, the synthesis process is performed. In the synthesis process, the silicon source reacts with the solid carbon source or the organic carbon compound to form silicon carbide powder according to the following reaction equation 1:

$$Si(s)+C(s)\text{->}SiC(s) \qquad \text{Reaction equation 1}$$

The heating temperature may be 1400° C. or higher so that the above-described reaction can easily occur. Specifically, the heating temperature may be 1400~1700° C. so that the resulting silicon carbide powder may have a beta phase that is stable at low temperatures. This beta phase can be composed of fine particles that increase the strength or the like of the silicon carbide powder. However, embodiments of the present disclosure are not limited thereto. In other words, it is to be understood that the heating temperature may also be higher than 1700° C. so that the silicon carbide powder may have an alpha phase that is stable at high temperatures. The synthesis process may be performed for about 1-7 hours.

A method for synthesizing silicon carbide powder in accordance with an embodiment of the present disclosure is performed using a direct reaction process among various processes. The direct reaction process is a process of preparing silicon dioxide powder by a direct reaction between carbon and silicon. Specifically, in the prior art, silicon carbide powder was prepared by reacting silicon dioxide with carbon according to the following reaction equation 2 using several reaction steps:

$$SiO_2(s)+3C(s)\text{->}SiC(s)+2CO(g) \qquad \text{Reaction equation 2}$$

In the process of preparing silicon carbide powder by the direct reaction process, a problem such as a decrease in the purity of silicon carbide powder could occur, because residual carbon and silicon that did not participate in the reaction were present during the preparation process. However, the method for preparing silicon carbide powder according to the embodiment of the present disclosure can solve this problem by using the silicon dioxide source in addition to the silicon source and the carbon source in the step of forming the mixture.

In other words, residual carbon can react with silicon dioxide to form silicon carbide. In addition, residual silicon can be controlled by controlling the amount of silicon dioxide source added. Specifically, silicon reacts with carbon earlier than silicon dioxide. Thus, residual silicon can first react with carbon, and the remaining silicon dioxide can be removed by reaction with silicon carbide in the reactor.

Specifically, silicon dioxide can be removed according to the following reaction equation 3:

$$SiO_2+SiC\text{->}3SiO+CO \qquad \text{Reaction equation 3}$$

Thus, in the method for preparing silicon carbide powder according to the embodiment of the present disclosure, the amounts of residual silicon and residual carbon that can remain during the reaction can be reduced using the silicon dioxide source in the step of forming the mixture, thereby preparing high-quality silicon carbide powder.

Herein, the present disclosure will be described in further detail with reference to preparation examples and comparative examples. It is to be understood, however, that these preparation examples are for illustrative purposes only and are not intended to limit the scope of the present disclosure.

PREPARATION EXAMPLE 1

50 g of metal silicon as a silicon source, 15 g of fumed silica as a carbon dioxide source, and 50 g of carbon black as a carbon source were mixed with each other to form a mixture. Herein, the metal silica had a mean particle diameter of 10 µm, the fumed silica had a mean particle diameter of 20 nm, and the carbon black had a mean particle diameter of 30 nm.

Then, the mixture was subjected to a synthesis process at a temperature of 1600° C. at a heating rate of 5° C./min for 3 hours, thereby forming silicon carbide powder.

The synthesis reaction started under an initial vacuum of $5\times12^{-2}$ Torr and performed by operation of a low-speed rotary pump. Also, the silicon carbide powder was prepared using the direct reaction process.

Preparation Example 2

Silicon carbide powder was prepared in the same manner as described in Preparation Example 1, except that 25 g of fumed silica was used as the silicon dioxide source.

Preparation Example 3

Silicon carbide powder was prepared in the same manner as described in Preparation Example 1, except that 85 g of phenol resin having a carbon residual rate of 60% after the carbonization process was used in place of carbon black as the carbon source to form the mixture and that the mixture was subjected to the carbonization process at a temperature of 850° C. at a heating rate of 3° C./min for 5 hours.

Comparative Example

Silicon carbide powder was prepared in the same manner as described in Preparation Example 1, except that 50 g of metal silicon as the silicon source and 50 g of carbon black as the carbon source were mixed with each other to form the mixture.

TABLE 1

|  | Mean particle diameter (μm) | Residual carbon (%) |
|---|---|---|
| Preparation Example 1 | 0.96 | 0.23 |
| Preparation Example 2 | 1.1 | 0.34 |
| Preparation Example 3 | 0.9 | 0.1 |
| Comparative Example | 1.2 | 3 |

As can be seen in Table 1 above, the residual carbon contents of the silicon carbide powders prepared in Preparation Examples 1 to 3 were lower than that in the Comparative Example. Specifically, it can be seen that the amounts of residual carbon in the silicon carbide powders of Preparation Examples 1 to 3 in which the silicon dioxide was further used to form the mixture was smaller than that in the silicon carbide powder of the Comparative Example in which only the silicon source and the carbon source were used to form the mixture.

Accordingly, in the method for preparing silicon carbide powder according to the embodiment of the present disclosure, the amount of residual carbon in the reaction step of preparing silicon carbide powder from the mixture by the direct reaction process can be reduced, because the carbon dioxide source is further used to form the mixture. Thus, high-purity and high-quality silicon carbide powder can be prepared by the direction reaction process.

As described above, in the method of preparing silicon carbide powder according to the embodiment of the present disclosure, silicon carbide powder is prepared by the direct reaction process. In addition, silicon carbide powder is prepared by mixing the silicon source and the carbon source together with a specific amount of the silicon dioxide source to form a mixture and allowing the mixture to react.

Thus, even when silicon carbide powder is to be prepared by the direct reaction process, high-quality silicon carbide powder can be prepared, because the amounts of residual carbon and residual silicon, which remain during the process, can be controlled by the silicon dioxide source.

Characteristics, configurations and effects described in the foregoing embodiments are included in at least one exemplary embodiment of the present disclosure and not limited to only one embodiment. Moreover, it will be understood by those of ordinary skill in the art that characteristics, configurations and effects illustrated in the embodiments set forth herein may be combined or modified in other embodiments. Therefore, such combinations and modifications may be construed as falling within the scope of the present disclosure.

While the present disclosure has been particularly shown and described with reference to exemplary embodiments thereof, these embodiments are only proposed for illustration purposes and do not restrict the present disclosure, and it will be apparent to those skilled in the art that various changes in form and details may be made without departing from essential characteristics of the embodiments set forth herein. For example, respective configurations stipulated in the embodiments may be modified and applied. Further, differences in such modifications and applications should be construed as falling within the scope of the present disclosure as defined by the appended claims.

What is clamed is:

1. A method for preparing silicon carbide powder, the method comprising the steps of:
    mixing a silicon source, a carbon source, and a silicon dioxide source to form a mixture; and
    allowing the mixture to react to form the silicon carbide powder,
    wherein the molar ratio of silicon dioxide ($SiO_2$) in the silicon dioxide source to the sum of silicon (Si) in the metal silicon source and carbon (C) in the carbon source is 0.01:1 to 0.3:1.

2. The method of claim 1, wherein the molar ratio of silicon dioxide in the silicon dioxide source to the sum of silicon in the silicon source and carbon in the carbon source is 0.1:1 to 0.2:1.

3. The method of claim 1, wherein the mixture is heated at a temperature between 1400° C. and 1700° C.

4. The method of claim 1, wherein the carbon source includes a solid carbon source, wherein the solid carbon source is selected from the group consisting of carbon black, carbon nanotubes and fullerene.

5. The method of claim 1, wherein the carbon source includes an organic carbon compound, wherein the organic carbon compound is selected from the group consisting of phenol resin, franc resin, xylene resin, polyimide, polyurethane, polyacrylonitrile, polyvinyl alcohol, cellulose, pitch, tar and sugar.

6. The method of claim 1, wherein the silicon dioxide source is selected from the group consisting of silica sol, silicon dioxide, fine silica and quartz powder.

7. The method of claim 1, wherein the molar ratio of metal silicon in the silicon source to carbon in the carbon source is 1:0.8 to 1:1.2.

8. The method of claim 1, wherein the molar ratio of metal silicon in the silicon source to carbon in the carbon source is 1:0.9 to 1:1.1.

* * * * *